Figure 1:
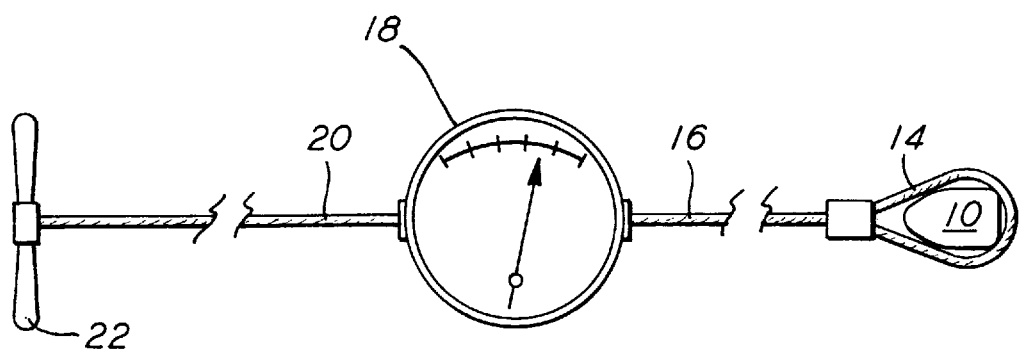

United States Patent [19]
Hanano

[11] Patent Number: 5,831,173
[45] Date of Patent: Nov. 3, 1998

[54] COUPLER HOOK FORCE GAGE

[75] Inventor: M. Nihad Hanano, Greer, S.C.

[73] Assignee: Westinghouse Air Brake Company, Wilmerding, Pa.

[21] Appl. No.: 870,875

[22] Filed: Jun. 6, 1997

[51] Int. Cl.$^6$ ................................................. G01N 3/08
[52] U.S. Cl. ........................ 73/831; 73/826; 73/862.393
[58] Field of Search ................... 73/862.391, 862.312, 73/862.393, 73, 826, 831; 33/651, 651.1, 604, 501

[56] References Cited

U.S. PATENT DOCUMENTS

| | | | |
|---|---|---|---|
| 1,247,249 | 11/1917 | Felcyn | 73/862.393 |
| 2,042,457 | 6/1936 | Conn | 73/826 |
| 2,154,280 | 4/1939 | Nadai et al. | 73/826 |
| 2,756,592 | 7/1956 | Foster | 3/862.393 |

*Primary Examiner*—George M. Dombroske
*Assistant Examiner*—Max H. Noori
*Attorney, Agent, or Firm*—James Ray & Associates

[57] ABSTRACT

A gage for measuring a force at which hooks of couplers used to couple passenger transit type vehicles together are biased when such vehicles are coupled together by such hooks. Such gage including a bracket member having at least one guide pin disposed thereon. Such at least one guide pin being sized and located to seat in at least one guide hole disposed in a railway transit coupler. An elongated tubular housing member is mounted on such bracket member. There is a main coil spring disposed within such elongated tubular housing member. A shaft member is disposed along a longitudinal axis of such main coil spring. A plunger member extends from a forward end of the shaft member and such tubular housing member for engaging a hook portion of such coupler and a power screw member is threadedly engaged into an end of the elongated tubular housing member opposite the forward end of such tubular housing member for translating the shaft member in such elongated tubular housing member and such plunger member into and from such hook of such coupler.

17 Claims, 4 Drawing Sheets

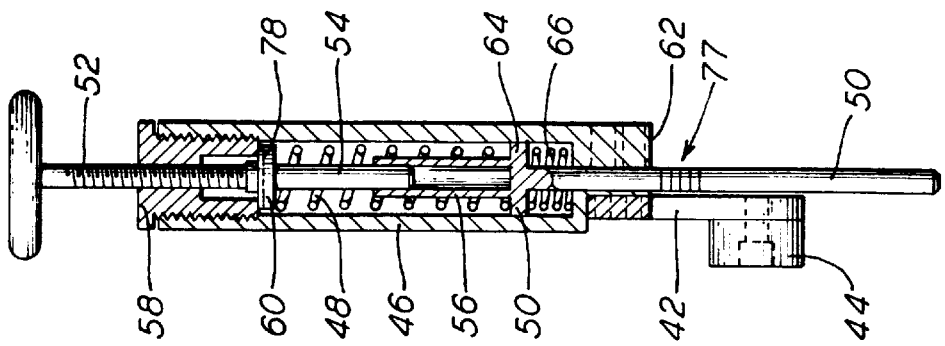
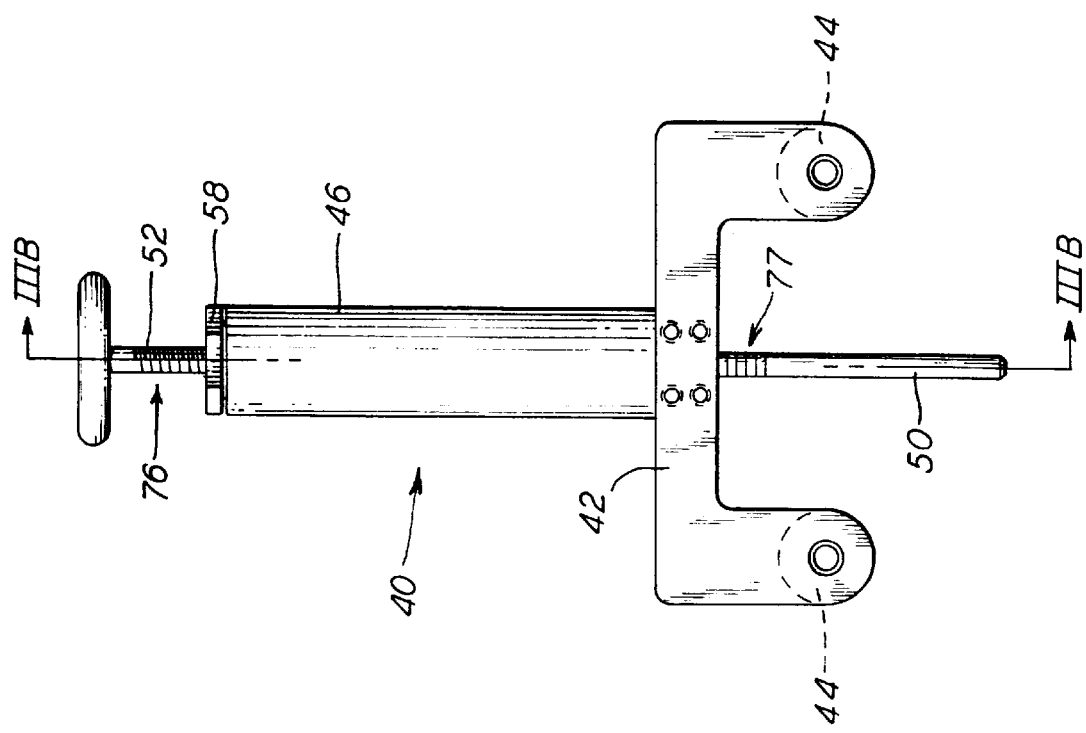

５,８３１,１７３

COUPLER HOOK FORCE GAGE

FIELD OF INVENTION

The present invention relates, in general, to passenger transit type couplers and, more particularly, this invention relates to a fixture for measuring the force at which coupling hooks are sprung by springs employed to insure positive reliable coupling of passenger transit type cars in a reliable safe manner.

BACKGROUND OF THE INVENTION

Coupling hooks for passenger rail vehicles operate under a predetermined force that is presently measured with a loop of cable connected to a dynamometer gage which, in turn, is connected to another cable having a handle at a remote end thereof. The loop of cable is placed around the hook of a coupler, and a direct force of between about 100 to 140 pounds is applied by an operator while another person observes initial movement of the hook. The dynamometer gage has a dial that is read when initial hook movement is noted. The observer then determines if spring force adjustment is within a specified hook force range.

The reliability and repeatability of this prior art type pulling method is, at best, a compromise and estimate only. The reason for this is because the operator pulls are often uneven and the reaction time of the observer watching for initial hook movement is slow. In addition, the cable scheme is somewhat unsafe and hazardous should the cable loop slip or the cable break.

SUMMARY OF INVENTION

The present invention solves the above described problems through the use of a bracket containing two pins which are sized and spaced apart in a manner to seat in guide pin holes of the face plate of a coupler. An elongated tubular housing is mounted on the bracket and contains a main coil spring which is located around an elongated shaft. A plunger extends from the forward end of the shaft and tubular housing for engaging the hook of the coupler, and a power screw is threaded into the end of the housing opposite the forward end for translating the shaft in the housing and the plunger to and from a coupling hook. A dial indicator is placed in contact with the hook such that when the hook moves against the force of the coupler's biasing spring, a workman notes hook movement by watching for dial movement. Markings may be placed upon the power screw, the tubular housing and/or the plunger to determine the amount of movement of the power screw or plunger and thus the amount of force experienced by the gage and plunger in order to move the hook.

OBJECTS OF THE INVENTION

It is, therefore, one of the primary objects of the present invention to provide a hook force measuring device which is a more reliable, accurate, and safe means for measuring the force at which coupler hooks for passenger rail vehicles are sprung and/or biased.

It is another object of the present invention to provide a hook force measuring device that does not require the use of a pull force on a cable attached to a coupler hook to measure the force at which coupler hooks for passenger rail vehicles are sprung and/or biased.

Yet another object of the present invention is to provide a hook force measuring device which will provide repeatedly reliable measurements of hook force that are not compromised by inconsistent jerks or pulls on a cable by a workman or slow reaction of the workman in observing initial hook movement.

A further object of the present invention is to provide a hook force measuring device that is a compact and lightweight instrument which can be readily applied directly to a coupler.

Another object of the present invention is to provide a hook force measuring device which can be applied to a coupler while it is mounted on a passenger rail vehicle or to a coupler that has been removed from such a vehicle without the need of special fixtures to hold the coupler.

THE DRAWINGS

Figure 2B:
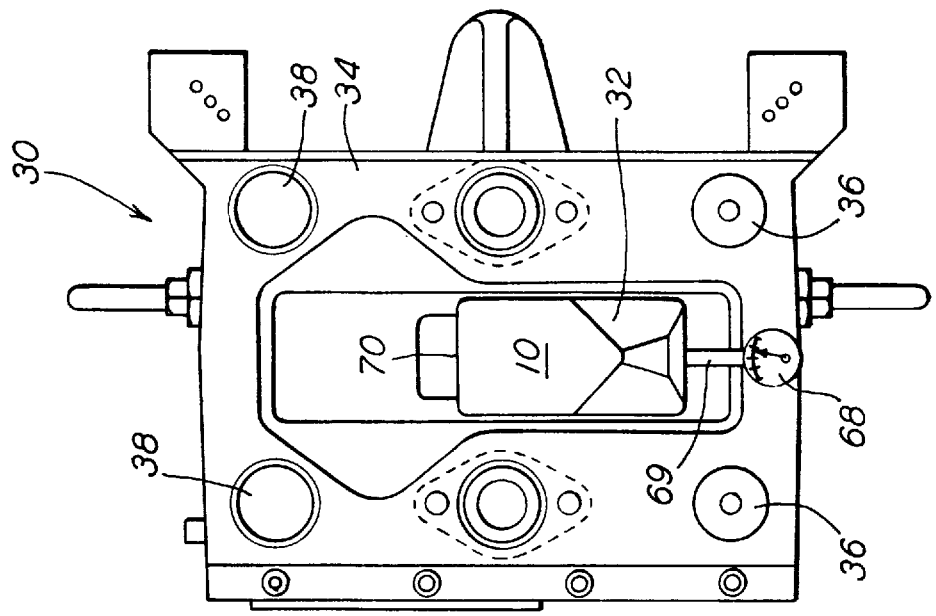
Figure 2A:
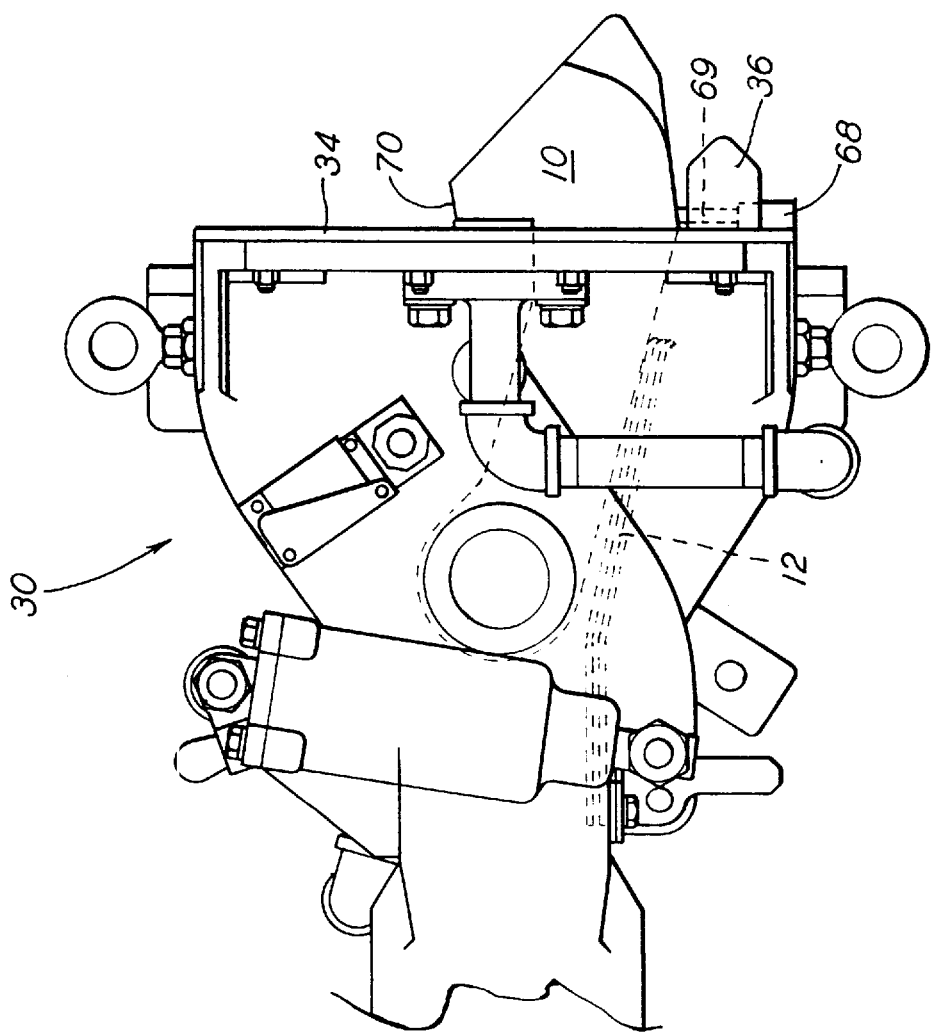
Figure 4:
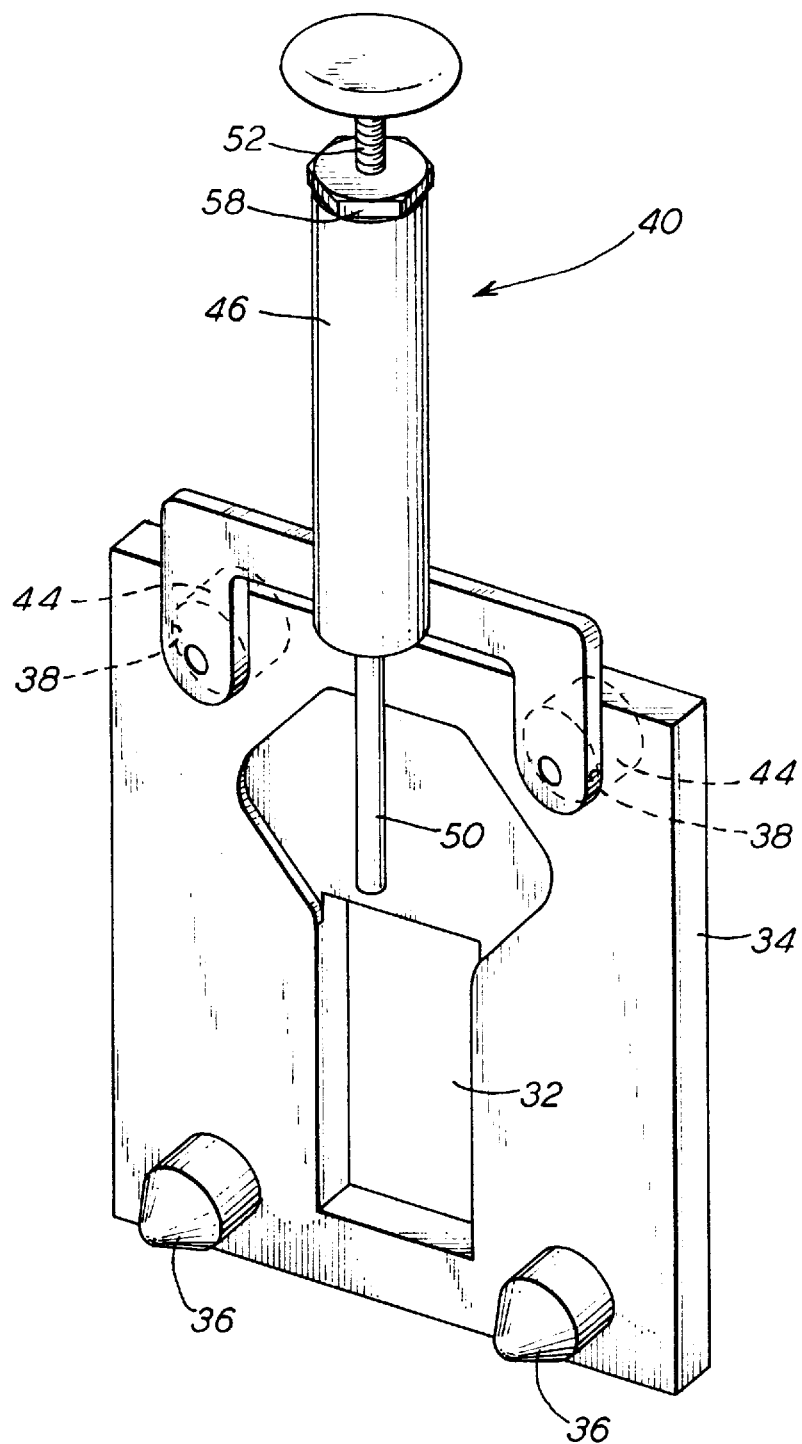

The advantages and objectives of the invention will be better understood from consideration the following detailed description in conjunction with the accompanying drawings in which FIG. 1 is a schematic representation of prior art type apparatus used for measuring the force imposed upon a coupling hook of a passenger railway vehicle by a hook biasing spring, FIG. 2A and 2B show respectively side and front elevation views of a coupling hook assembly, FIG. 3A is a plan view of the coupling hook force gage of according to present the invention, FIG. 3B is a sectional view of the gage taken along line III–III of FIG. 3A, and FIG. 4 is a perspective view of the gage of the present invention connected to a face plate of the coupling hook assembly illustrated in FIGS. 2A and 2B.

PREFERRED EMBODIMENT

Reference is now made, more particularly, to the drawings. Illustrated in FIG. 1 thereof is a prior art apparatus for measuring the force at which railway passenger car coupling hooks 10 are sprung or biased by a leaf spring 12 (FIG. 2A). As best seen in FIG. 2A, spring 12 is illustrated as a leaf spring but a coil spring can be used in place of the leaf spring. Such springs 12 are used to insure a positive reliable coupling of the railway cars.

This prior art apparatus includes a loop of cable 14 that is placed around such car hook 10, and a length of cable 16 connecting the cable loop to one side of a dynamometer gage and dial 18. A second cable 20 is connected to the opposite side of the gage, and is provided with a handle 22 which is connected to the end of such second cable 20 remote from the gage. A workman pulls on the handle 22 to exert a pulling force on car hook 10 while another workman watches for initial movement of the hook, which hook must move against the force of spring 12. The gage 18 measures the pulling force being imposed on the hook 10 by the operator while the dial thereof provides a visible reading of the pulling force being exerted. When initial hook movement is observed, the dial is then read by one or both of the workmen. If the force presented by the dial reading is not within the specified range that insures reliable coupling, spring 12 is adjusted to provide a spring force within such range. If the spring adjustment is not effective in locating the force within the required range, the spring 12 is then replaced with another spring that does provide the proper force.

As discussed above, the means illustrated in FIG. 1 has certain disadvantages in regard to safety, reliability and repeatability, i.e., if the loop located around the hook should happen to slip off the hook, or if anyone of the cables happens to break while a workman pulls on the hook, personnel can be injured. In addition, repeatability and reliability of this prior art device is uncertain if the force of each pull by the workman is not evenly applied when the measurement is read, or if the observer workman is not consistent in observing first, initial movement of the hook.

FIGS. 2A and 2B of the drawings show a hook assembly 30 for coupling together passenger railway cars, which assembly includes the coupling hook 10. As can be seen in FIG. 2A and 2B, the coupling hook 10 of the assembly extends through an opening 32 provided in a vertically disposed face plate 34. The above described leaf spring 12 bears against the hook to maintain a proper coupling force on the hook, as noted earlier. The lower end of the face plate 34 contains two outwardly extending guide pins 36 for seating in two corresponding guide pin holes (not shown) provided in a corresponding face plate of the corresponding coupling assembly of the passenger car to be coupled to the passenger car containing assembly 30. Similarly, the upper end of the face plate 34 has two guide pin holes 38 for receiving two corresponding guide pins (not shown) provided on the face plate of the corresponding coupling assembly of the car to be coupled to such car containing assembly 30.

Reference is now made to FIGS. 3 and 4 which illustrate a relatively simple portable and compact gage 40 which provides repeatedly reliable measurement of the force that is being imposed by the springs 12 of coupling hooks 10. Specifically, gage 40 comprises a planar U-shaped bracket 42 having two pins 44 extending perpendicularly from the plane of the bracket 42, and sized and spaced to seat in the guide pin holes 38 of face plate 34. Attached to the U-shaped bracket 42, and laterally centered, between pins 44 is an elongated cylindrical container or tubular housing 46 which contains a main coil spring 48 that is located between the inner ends of a plunger 50, which extends outwardly from such U-shaped bracket 42, and a power screw 52. Spring 48 is also located around an intermediate shaft 54 and an inner sleeve 56 attached to the inner end of plunger 50. Intermediate shaft 54 extends between the inner end of the power screw 52 and such inner sleeve 56. Power screw 52 is centered by and is threaded in and through end cap 58, with the end cap 58 being suitably secured to the end of cylindrical housing 46. Such power screw 52 also is centered in housing 46 by a washer 60 connected to the inner end of the screw in a manner that allows the screw to rotate while the washer remains stationary. Plunger 50 is centered in container 46 by an end wall 62 of the container and by a washer type head 64 attached to the inner end of the plunger 50.

A coil puppet spring 66 is located around the end of such plunger 50 located within container 46 and in axial alignment with main spring 48. Puppet spring 66 is held between the end wall 62 of container 46 and the washer type head 64 of plunger 50. The puppet spring 66 is also smaller than spring 48 to provide a spring force that is substantially less than that of spring 48.

The operation of gage 40 is described in terms of FIG. 3 and 4 of the drawings, and operates in conjunction with a dial indicator 68 (FIG. 2A & B). The dial indicator is secured to face plate 34 of coupler 30 and is located in contact with hook 10. The indicator can be provided with a magnetic base such that a workman can simply place the indicator against the face plate 34 to secure the indicator to such face plate 34. The spaced guide pins 44 of the gage are placed in guide pin holes 38 of the coupler's face plate 34 in the manner shown in FIG. 4. Such placement of gage 40 locates plunger 50 directly above hook 10, while power screw 52 is located above the face plate to provide ready access by a workman. The bracket 42 is held in place and against movement by pins 44 being located in guide holes 38 of the coupler's face plate 34. Power screw 52 is now rotated in the end cap 58 into container 46 by a workman thereby compressing the weaker puppet spring 66 and directing plunger 50 toward hook 10. Hook 10 has an upper face line and surface 70 that is engaged by the outer end of plunger 50, when the power screw 52 is rotated in end cap 58 and relative to washer 60 against the puppet spring 66. Spring 48 remains uncompressed until plunger 50 contacts the face line surface 70 of hook 10. Further rotation of screw 52 into cylinder begins compression of spring 48, as intermediate shaft 54 moves into inner sleeve 56.

With continued compression of main spring 48 by power screw 52, the force of hook spring 12 (FIG. 2) is exceeded by the force of spring 48. This causes such hook 10 to move slightly. This movement is registered by dial indicator 68, as hook movement is against a shaft 69 abutting the hook, the shaft being resiliently mounted in the housing of the dial indicator. The workman notes the indication of hook movement presented by the dial indicator and immediately stops rotating power screw 52. He then notes the position of power screw 52 in the container housing 46, or the position of plunger 50 relative to the cylinder end wall 62 to determine the force that moved the hook 10. If this force is within that range specified that insures reliable coupling between the cars, the workman does nothing more except, of course, to remove gage 40 and dial indicator 68 from face plate 34. If the force that moved the hook 10 is too low or too high adjustment of spring 12 is made to bring the hook force into the proper range.

In FIG. 4, container housing 46 is provided with markings 75 to provide a reading of the position of the inner end of power screw 52 or washer 60 within the container housing 46, and thus the amount of force being exerted on the coupling hook 10 by such spring 48 to slightly initially movement of the coupling hook 10, i.e., gage 40 is calibrated in a manner that provides the force of exertion effected by spring 48 as indicated by the location of power screw 52 in the container housing 46. Similar markings 76 and 77 can be provided respectively on power screw 52 and plunger 50.

The edge of the washer 60 can be, and preferably is, provided with a circumferential groove 78, as illustrated by a solid line in FIGS. 3A and 3B. In the presently preferred embodiment of the invention, this circumferential groove 78 will contain a brightly colored paint. Such painted circumferential groove 78 being provided to serve as a pointer for the workman in moving the coupling hook 10 and noting the force measurements.

Gage 40 is removed from such face plate 34 by an outward rotation of the power screw 52 from compression of springs 48 and 66, and the plunger 50 from coupling hook 10, so that gage 40 can be easily removed from the face plate 34.

While a presently preferred embodiment of a gage for measuring the hook force of a passenger car coupler has been described above, it should be understood that various other modifications and adaptations of the gage may be made by those persons who are skilled in the art of coupling passenger transit vehicles without departing from the spirit of the invention and the scope of the appended claims.

I claim:

1. A gage for measuring a force at which hooks of couplers used to couple passenger transit type vehicles together are biased when such vehicles are coupled together by such hooks, said gage comprising:

(a) a bracket member having at least one guide pin disposed thereon, said at least one guide pin being sized and located to seat in at least one guide hole disposed in a railway transit coupler;

(b) an elongated tubular housing member mounted on said bracket;

(c) a main coil spring disposed within said elongated tubular housing member;

(d) a shaft member disposed along a longitudinal axis of said main coil spring;

(e) a plunger member extending from a forward end of said shaft and said tubular housing member for engaging a hook of such coupler, and (f) a power screw threadedly engaged into an end of said elongated tubular housing member opposite said forward end of said tubular housing member for translating said shaft in said elongated tubular housing member and said plunger into and from such hook of such coupler.

2. The gage, according to claim 1, wherein said gage further includes a puppet spring located in said elongated tubular housing member and in axial alignment with said main coil spring.

3. The gage, according to claim 2, wherein said puppet spring is located between a forward end of said main coil spring and an end wall at said forward end of said elongated tubular housing member.

4. The gage, according to claim 1, wherein said main coil spring is located between a washer attached to said power screw and a washer type head located near said forward end of said elongated tubular housing member.

5. The gage, according to claim 1, wherein said bracket member is substantially U-shaped, with said at least one guide pin being located adjacent at least one end of at least one leg of the U of said U-shaped bracket member.

6. The gage, according to claim 1, wherein said elongated tubular housing member has an external surface upon which markings are provided to indicate an amount of power screw movement and thus a pressure being exerted by said gage on such coupling hook.

7. The gage, according to claim 1, wherein said power screw is provided with markings to indicate said amount of movement of said power screw and thus said amount of force being exerted by said gage on such coupling hook.

8. The gage, according to claim 1, wherein said plunger member is provided with markings to indicate an amount of translation of said plunger member and thus said amount of force being exerted by said gage on such coupling hook.

9. A force measurement apparatus for measuring a force at which hooks of couplers used to couple passenger transit type railway vehicles together are biased when such passenger transit type railway vehicles are coupled together by such hooks, said force measurement apparatus comprising:

(a) a dial indicator engageable with a face plate of such couplers;

(b) a bracket member;

(c) at least two guide pins disposed on said bracket member, said at least two guide pins being sized and located in a position to seat in guide holes provided in a railway transit coupler;

(d) an elongated tubular housing mounted on said bracket member and containing therein a main coil spring located around a shaft member;

(e) a plunger member extending from a forward end of said shaft member and said elongated tubular housing member for engaging such hook of such railway transit coupler; and (f) a power screw member threadedly engaged into an end of said elongated tubular housing member opposite said forward end of said elongated tubular housing member for translating said shaft member in said elongated tubular housing member and said plunger member to and from such hook of such railway transit coupler, said plunger member being effective to initiate movement such hook of such railway transit coupler under force of said power screw while said dial indicator registers such movement.

10. A force measurement apparatus, according to claim 9, wherein said force measurement apparatus further includes a puppet spring located in said elongated tubular housing member and in axial alignment with said main coil spring.

11. A force measurement apparatus, according to claim 10, wherein said puppet spring is located between a forward end of said main coil spring and an end wall at said forward end of said elongated tubular housing member.

12. A force measurement apparatus, according to claim 9, wherein said main coil spring is located between a washer attached to said power screw and a washer type head located near said forward end of said elongated tubular housing member.

13. A force measurement apparatus, according to claim 9, wherein said bracket member is substantially U-shaped, with said at least two guide pins being located adjacent an end of each leg of the U of said U-shaped bracket member.

14. A force measurement apparatus, according to claim 9, wherein said elongated tubular housing member has an external surface portion upon which markings are provided to indicate an amount of movement of said power screw member and thus a pressure being exerted by said force measurement apparatus on such coupling hook of such passenger transit type railway vehicle.

15. A force measurement apparatus, according to claim 9, wherein said power screw member is provided with markings to indicate said amount of movement of said power screw member and thus said amount of force being exerted by said force measurement apparatus on such coupling hook of such passenger transit type railway vehicle.

16. A force measurement apparatus, according to claim 9, wherein said plunger member is provided with markings to indicate an amount of translation of said plunger member and thus said amount of force being exerted by said force measurement apparatus on such coupling hook of such passenger transit type railway vehicle.

17. A method of measuring a force at which hook portions of couplers used to couple passenger transit type railway vehicles together are biased when such passenger transit type railway vehicles are coupled together by such hook portions of such couplers, said method comprising the steps of:

(a) placing a dial indicator on a coupler and in contact with a hook portion of said coupler;

(b) locating a gage on said coupler having a plunger member disposed to engage said hook portion when a power screw member of said gage translates said plunger member to said hook portion;

(c) rotating said power screw member to translate said plunger member to said hook portion;

(d) effecting initial movement of said hook portion with said power screw member and plunger member;

(e) using said dial indicator to determine such initial movement of said hook portion; and (f) using said gage to indicate an amount of force needed to effect such initial movement.

* * * * *